Jan. 5, 1960   E. A. KNIPE   2,919,756
RIDING MOWER
Filed March 2, 1956   3 Sheets-Sheet 1
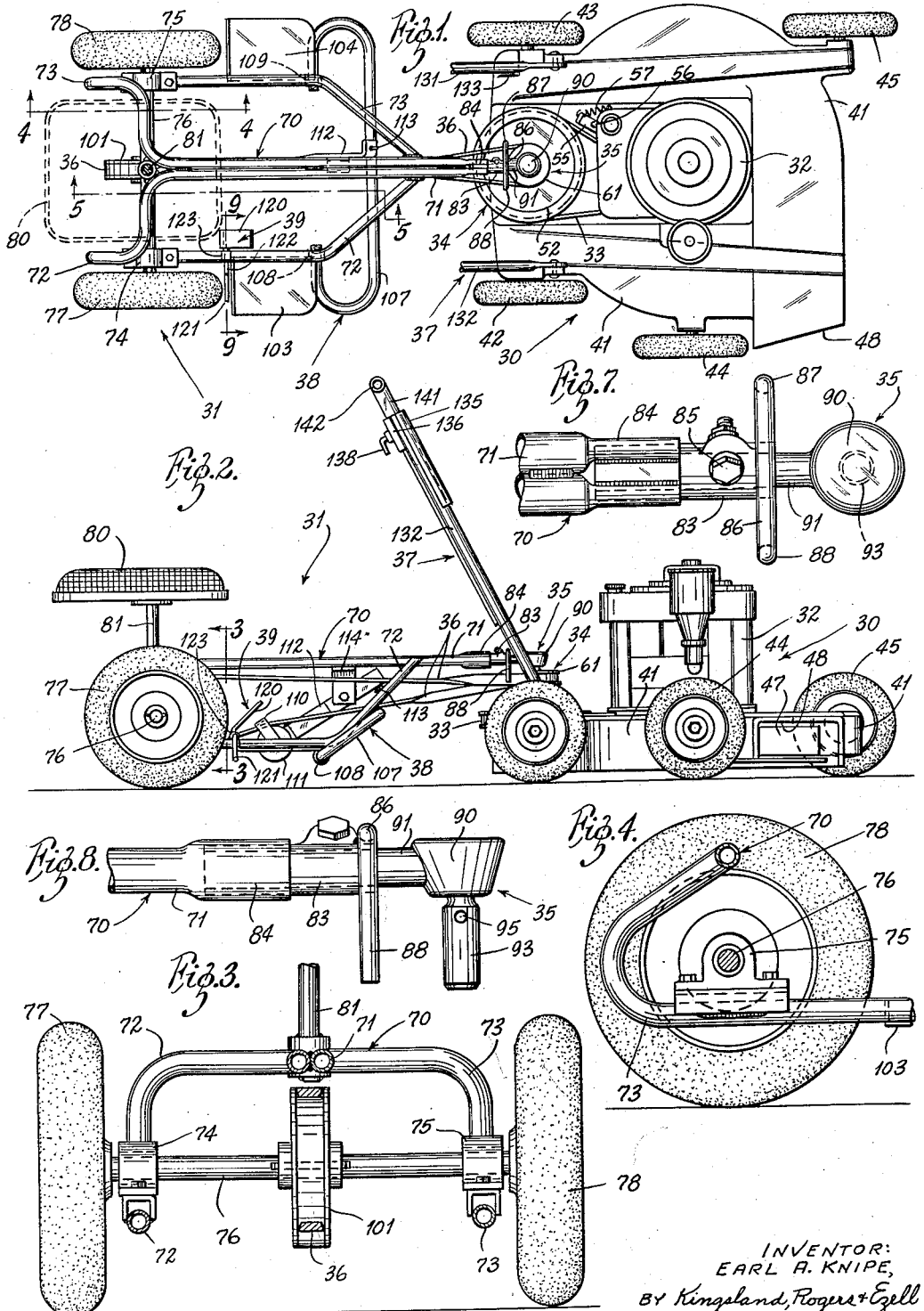
INVENTOR:
EARL A. KNIPE,
BY Kingsland, Rogers & Ezell
ATTORNEYS

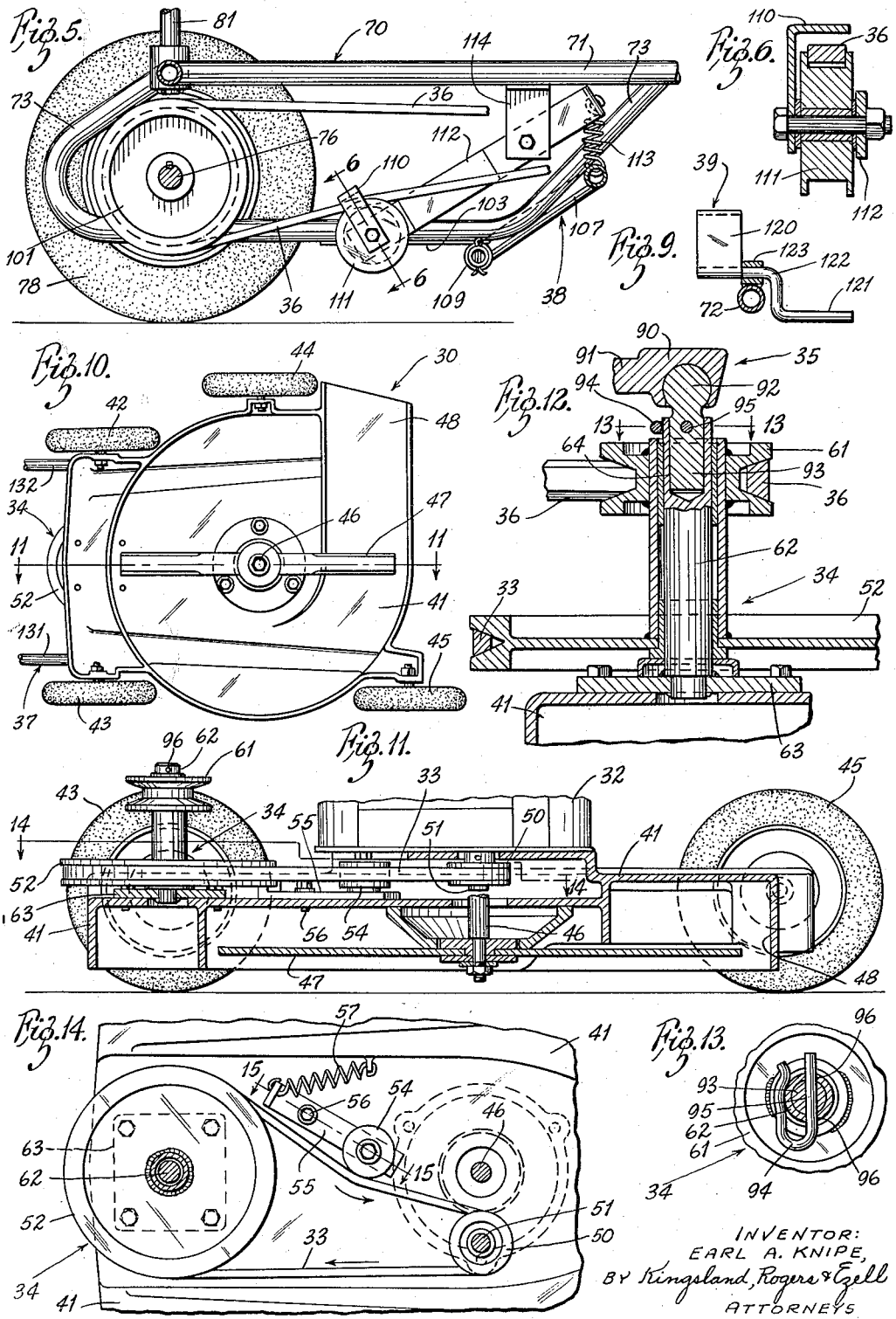

Jan. 5, 1960 E. A. KNIPE 2,919,756
RIDING MOWER
Filed March 2, 1956 3 Sheets-Sheet 3
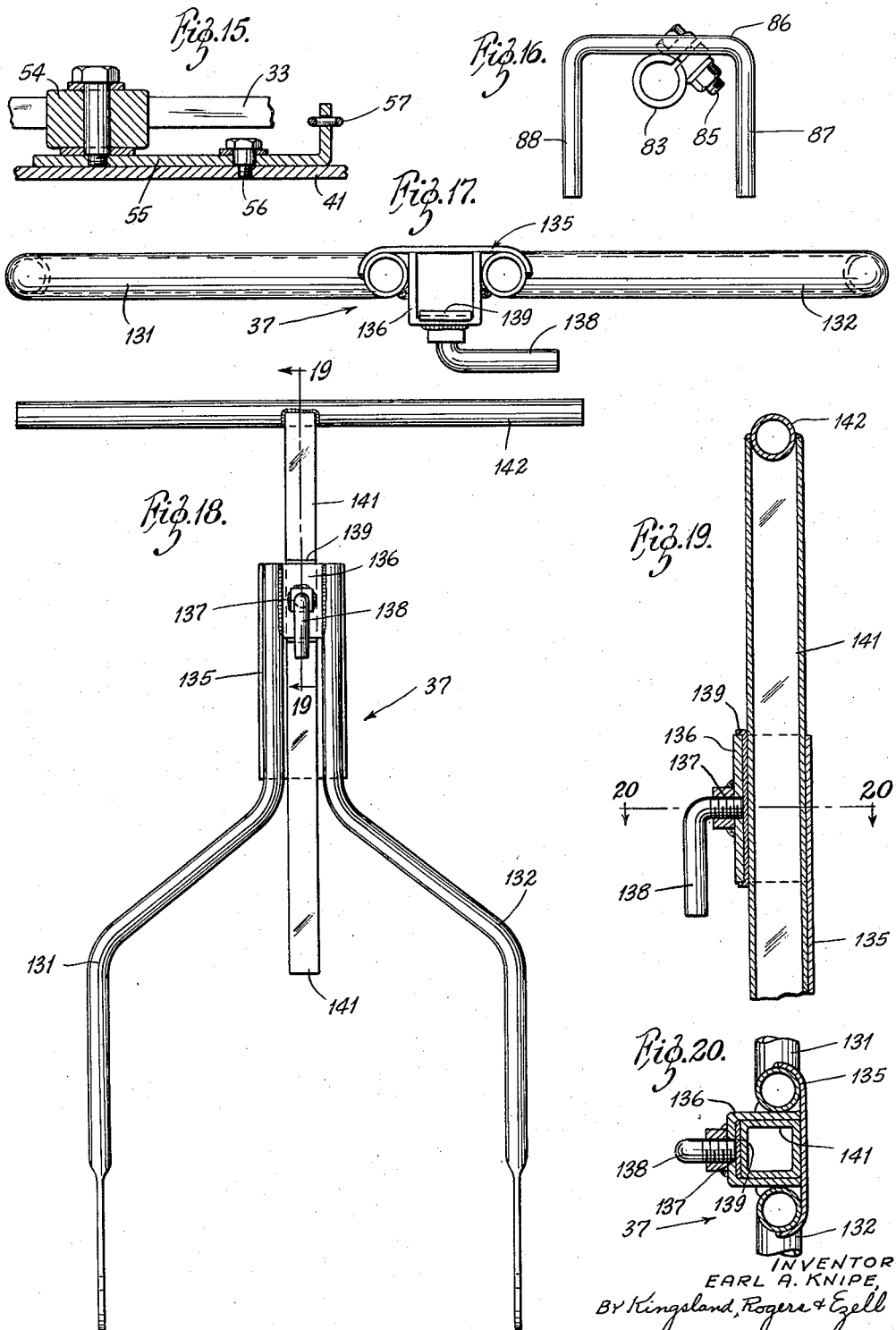
INVENTOR:
EARL A. KNIPE,
BY Kingsland, Rogers & Ezell
ATTORNEYS

United States Patent Office 2,919,756
Patented Jan. 5, 1960

2,919,756

RIDING MOWER

Earl A. Knipe, Hamilton, Ill.

Application March 2, 1956, Serial No. 569,138

6 Claims. (Cl. 180—11)

This invention relates to improvements in personnel carrying mowers and in particular is concerned with a riding mower which may be detachably connected to a conventional push-type mower having novel auxiliary power take-off means.

By means of this invention there has been provided a simplified riding mower in the form of a sulky carriage which may be connected to a push type of mower. Motive power is provided through a take-off from the cam shaft of the engine mounted on the mower and by which power is provided through pulley means to the wheels of the sulky. By virtue of this simple construction, easy steering of the assembly may be effected by utilizing the conventional handle of the mower and firm traction is provided through the powered wheels on the sulky which have additional friction due to the weight of the operator. Moreover, the sulky may be quickly detached in a matter of seconds in order that the mower may be used in the conventional pushing fashion to cut around relatively inaccessible areas.

In the past, riding types of mowers have been conventionally powered by traction wheels on the mower itself and the operator is carried along on a carriage which is pulled by the mower. This has necessitated a fairly heavy mower in order that sufficient traction may be provided. Therefore, in these cases the mower cannot be easily operated in a pushing fashion when detached from the riding section. In other devices where an operator is carried on a riding type of mower, the apparatus has been large and bulky and, where power is supplied to wheels underneath the operator, there has been no simple construction provided so that the mower may be detached and operated by manual pushing.

Accordingly, through this invention there has been provided an apparatus which may be used in a manner where the operator rides in a sulky and power is provided from the mower to the sulky wheels for simple and efficient mowing operations. Where desired, the sulky may be removed and thereafter the mower may be manually pushed in the conventional fashion without sacrificing any of the simplicity of the mower structure by way of added encumbrances. The mower and sulky structure of this invention are simplified in design so that operation may be carried out by unskilled householders and used in any desired application. In addition, the structure in operation is easy to handle and simple in design while there are a minimum number of parts to maintain and service is minimized. Moreover, safety means are provided so that the sulky is not powered unless pressure is applied to a clutch and through additional brake means the operation may be completely controlled and safely handled by children, housewives and other classes of people who need not be mechanically inclined.

Accordingly, it is the principal object of this invention to provide a riding mower which may be conventionally employed with a push type of power mower through a single power source.

A further object of this invention is to provide a power motor having auxiliary power take-off means.

Another object of this invention is to provide a sulky or a carriage which may be detachably connected to a push type of mower with power being applied from the mower to the rear wheels of the carriage.

Still another object of this invention is to provide a riding sulky which may be detachably connected to a power mower having a handle in such a manner that the apparatus may be employed using the handle of the mower as a steering mechanism and with power being furnished through the mower to move the apparatus along the ground.

Still another object of this invention is to provide a power mower having a sulky which may be attached thereto with means for propelling the apparatus along the ground and safety means controlled by the operator so that tractive power is applied only when pressure is applied by the operator to a clutch mechanism.

Yet another object of this invention is to provide a self-propelled mower whereby a sulky adapted to carry an operator may be detachably connected to a conventional power mower of the push type in such a manner that the apparatus may be used to carry an operator or, after disconnecting, it may be employed by conventionally pushing the mower along the ground by manual effort.

Still another object of this invention is to provide a power mower with an auxiliary power take-off whereby a sulky may be detachably connected to it for carrying an operator and which is of simple and rugged construction and relatively low cost.

Further objects of this invention will appear in the detailed description which follows and will be further apparent to those skilled in the art.

In the drawings, a preferred embodiment of this invention is illustrated for the purpose of example. It is to be understood that this is for purposes of illustration only, however, and that the invention is not limited thereto. In the drawings:

Figure 1 is a top plan view of the entire mower and sulky assembly with the sulky seat being shown in dotted lines;

Figure 2 is a view in side elevation of the mower and sulky;

Figure 3 is a cross-sectional view taken on the line 3—3 of Figure 2 and enlarged showing the rear wheel structure of the sulky;

Figure 4 is an enlarged view in cross-section taken on the line 4—4 of Figure 1 showing the sulky wheel structure;

Figure 5 is an enlarged view in cross-section taken on the line 5—5 of Figure 1 showing the sulky wheel and pulley structure together with a portion of the clutch;

Figure 6 is an enlarged view in cross-section taken on the line 6—6 of Figure 5 showing the clutch wheel;

Figure 7 is an enlarged plan view of a fragmentary portion of the connecting means at the front of the sulky;

Figure 8 is a view similar to Figure 7 but taken in front elevation;

Figure 9 is an enlarged view in cross-section taken on the line 9—9 of Figure 1 showing the sulky brake structure;

Figure 10 is a bottom plan view of the mower unit;

Figure 11 is an enlarged view in cross-section taken on the line 11—11 of Figure 10 showing the mower and the auxiliary drive furnishing power through pulley means to the sulky;

Figure 12 is an enlarged fragmentary view taken in vertical section of the longitudinal axis of the mower at its rear showing the pulley power means and the means for attachment from the mower to the sulky;

Figure 13 is a view in section taken on the line 13—13 of Figure 12 showing a lock;

Figure 14 is a view in section taken on the line 14—14 of Figure 11 showing pulley belt tensioning means in the mower auxiliary drive;

Figure 15 is an enlarged view in section taken on the line 15—15 of Figure 14 showing the pulley belt tensioning means;

Figure 16 is an enlarged view and side elevation of the sulky pulley belt guard and adjustment means taken from the right side of Figure 2, and looking from the mower towards the sulky;

Figure 17 is a top plan view of the mower handle and steering mechanism;

Figure 18 is a view in front elevation of the handle of Figure 17 which would appear taken from the left side of Figure 2 of this handle;

Figure 19 is a view in cross-section taken on the line 19—19 of Figure 18 showing the handle and extension means; and Figure 20 is a view in cross-section taken on the line 20—20 of Figure 19 showing the extension mechanism.

Referring now to Figures 1 and 2, it will be seen that the mower and sulky apparatus of this invention includes a mower generally indicated at 30 and a sulky or carriage generally indicated at 31. The mower portrayed is of the rotary type, although it is to be understood that other mowers such as the reel type could also be employed.

The main components of the apparatus include an engine 32 mounted centrally upon the mower, an auxiliary power take-off pulley belt 33 and an auxiliary double pulley block 34 mounted at the rear of the mower. A ball and socket universal joint 35 is connected to the top of the pulley block to connect the sulky to the mower, and a sulky pulley belt 36 furnishes power to the rear wheels of the sulky. Steering is effected by the handle 37 extending from the rear of the mower. To control the sulky a clutch pedal 38 and brake pedal 39 are provided.

The mower 30 is more fully shown in Figures 10 and 11 where it is seen that the engine 32 is mounted upon a base 41 which rides upon rear wheels 42 and 43 and front wheels 44 and 45. A crankshaft 46 depends from the engine to the base and has a rotary mower blade 47 fastened at the bottom. An exhaust 48 provides for the expulsion of cut grass as is conventional.

An auxiliary power take-off is provided by means of a pulley wheel 50 supported on an extension 51 of the engine cam shaft and around which the auxiliary belt 33 is fitted. The other end of the pulley belt 33 is fitted around a bottom pulley wheel 52 mounted on the double pulley block 34 at the rear of the mower base. The pulley belt 33 is properly tensioned by a roller wheel 54 mounted on a swivel arm 55 to pivot around a shaft 56 through the biasing force of a spring 57. By this means, a safety mechanism is provided which prevents too large a torque being exerted upon the pulley wheel 50 on the cam shaft 51 so as to guard against bending of the cam shaft.

At the top of the pulley block 34, a second pulley wheel 61 is provided around which the sulky pulley belt 36 may be fitted to furnish power to the sulky. Also extending through the pulley wheels 52 and 61 is a shaft 62 which is welded upon a support plate 63 mounted upon the rear portion of the mower base. An opening 64 is provided at the top of this shaft so as to receive a sulky lock hereafter to be described.

The sulky 31 is composed of a main frame 70 comprised of tubular steel which includes a forwardly extending tongue 71 and a supporting bottom and rear portion comprised of braces 72 and 73. The structure of this frame is more clearly portrayed in Figures 3, 4 and 5, where it will be seen that the braces 72 and 73 are connected on pillow block journals 74 and 75, respectively. An axle 76 extends through the journals and is attached to wheels 77 and 78. A seat 80 is fastened to a shaft 81 which slides in a sleeve welded to the junction of the braces 72 and 73 on the frame.

The connecting means 35 which is positioned at the forward end of the tongue 71 for connecting the sulky to the mower is shown in Figures 7, 8, 12 and 16. This means includes a tubular clamp 83 positioned within a socket 84 at the forward end of the tongue, as shown in Figure 7. This clamp shown in Figure 16 is split and has a draw-bolt 85 for tightening the clamp, as will appear further. Also connected to the clamp is a belt guard 86 which has two opposed downwardly depending arms 87 and 88 for confining the sulky belt.

As shown in Figure 7, a connecting socket 90 having a shaft 91 is fitted within the clamp 83 and tightly connected thereto by the draw-bolt. The socket 90 may be adjusted within the clamp by loosening and then tightening the draw-bolt 85. Within the socket 90, a ball 92 is received having an integral shaft 93, as shown in Figure 12. This ball and socket joint may, therefore, be connected within the top open portion of the shaft 62. A lock pin 94 fits through an opening 95 in the ball shaft 93 and through opening 96 in the shaft 62. By this means, the sulky is connected to the rear portion of the mower and freedom of movement in any direction is provided for.

The sulky power mechanism includes a pulley wheel 101 keyed to the sulky axle 76. The sulky power belt 36 is then fitted around this pulley at its rear portion and around the pulley wheel 61 on the power pulley block at its forward end. By this means, motive power is furnished from the engine 32 to the auxiliary power take-off pulley 50, and the belt 33 to the lower pulley 52. The belt 36 on the top pulley wheel 61 of the pulley block 34 carries the power to the pulley wheel 101 on the axle 76. By means of driving keys in the axle and ratchets in the wheels 77 and 78, these wheels are powered.

The belt 36 is loosely mounted between the pulley wheel 61 and the sulky axle pulley wheel 101 and is not in driving tension until the clutch 38 is operating. The clutch 38 is mounted upon a footrest comprising foot plates 103 and 104 which are welded to the bottom braces 72 and 73. The clutch 38 is comprised of a clutch bar 107 which is mounted at its opposed ends within journals 108 and 109 welded to the underside of the footrest plates 103 and 104.

The clutch bar 107 controls a belt guard plate 110 and a clutch tensioning wheel 111, as shown in Figures 5 and 6. This wheel is adapted to apply biased tension upon the pulley belt 36 through the operation of a pivot bar 112 connected at its opposite end to a clutch spring 113. The clutch spring provides for some take-up in the belt due to irregularities in ground surface when the clutch bar 107 is operated. The clutch pivot bar 112 is pivoted on a support 114 welded to the frame. In normal operation without pressure exerted on the clutch bar 107, the clutch plate 110 and wheel 111 will not be applied to tighten the pulley belt, but will let it ride loosely between the pulley wheels 61 and 101 and no power will be exerted upon the sulky wheel.

As a further control for the operation of the sulky, a brake 39 has been provided. This brake pedal is more particularly shown in Figure 9 and includes the brake pedal plate 120 which is connected to a brake rod portion 121 through an integral shaft portion 122. The shaft 122 fits within a journal 123 which is affixed to the frame support brace 72. The brake rod 121 is adapted to bear against the wheel 77 when pressure in a downward direction is put upon the brake pedal.

In order to steer the sulky when it is attached for use or the mower when it is to be manually employed, the handle 37 is utilized. This handle is best shown in Figures 2, 17, 18 and 19. It includes a fabricated frame having arms 131 and 132 which are pivoted to the rear portion of the mower base. This provides for movement of the handle 37 about the pivotable connection at the mower within an arcuate limit. A stop 133 shown in Figure 1 is provided to the rear of the pivotable connection to keep the handle from falling flat. The fabricated arms 131 and 132 of the handle are joined in a tongue portion 135 which is provided with a sleeve 136 having a rectangular cross section, as shown in Figures 18 and 20. The sleeve 136 has a threaded opening 137 to receive a threaded lock bar 138 bearing against a protective bearing plate 139 for tightening a telescope handle extension 141. The handle extension 141 fits through the sleeve 136 and has a handle bar 142 which may be grasped by the operator in steering the sulky or the mower.

Operation

The sulky as portrayed in Figures 1 and 2 is shown ready to be used by an operator. In this condition and as the sulky stands, the wheels will not be powered until the operator depresses the clutch pedal 107. In the rest position, as shown, the auxiliary take-off pulley belt 33 supplies power to the pulley block 34 from the mower pulley wheel 50 situated on the cam shaft extension 51. The rotary power furnished to the pulley block 34 is employed to furnish power and movement to the sulky belt 36 through the pulley wheel 61 connected to the top portion of the pulley block 34. The belt 36 in this condition slips as it is not tight, and therefore no movement of the sulky pulley wheel 101 is effected.

Power may be applied by the operator, however, as he is seated upon the sulky, by depressing the clutch bar 107 by merely resting the forward portion of his foot thereon with the heel being rested upon the foot plates 103 and 104. As the clutch bar is depressed, the clutch wheel 111 is caused to bear against the pulley belt 36 by action through the clutch spring 113 and the pivot bar 112, as will be seen from Figure 5, and the belt is tightened so as to cause the pulley wheel 101 to rotate and move the sulky wheels 77 and 78. As a result, the sulky is powered and will push the mower forwardly.

Steering and control of the sulky and the mower are effected through the ball and socket connecting means 35. Thus, torsional or twisting movement between the mower and the sulky is provided for as will be encountered in mowing the usual undulating lawn surfaces or the like. By this means, hills and terraces may be safely and properly mowed.

Full control and steering are effected through the handle 37. Where it is desired to turn the sulky, the handle is grasped by the handle bar 122 and depressed so that the forward wheels 44 and 45 of the mower are lifted from the ground and the handle is then slightly pivoted either to the left or to the right to effect movement of the mower and the following sulky in these directions.

Further control is effected where it is desired to brake the sulky immediately by operation of the brake pedal 120. When this is depressed by the heel of the operator, the brake bar 121 bears against the wheel 77 and causes it to stop. Further braking may be effected without the use of the brake by merely taking the feet off the clutch bar which removes the driving force to the wheels and the sulky will stop through frictional forces alone when it finishes coasting. This is a safety feature of the apparatus as the device may not be operated unless pressure is applied against the clutch bar through continued effort of the operator by the application of his foot thereupon.

Where it is desired to disconnect the sulky from the mower while mowing ditches or small inaccessible areas, this may be expeditiously accomplished without the requirement of any special tools and in a matter of seconds. All that is required is the removal of the lock pin 94 which holds the ball and socket joint in the top portion of the shaft 62 of the pulley block at the rear of the mower. After this pin has been withdrawn, the tongue of the sulky is merely lifted upwardly and the mower is ready to be used. The handle 37 may first be telescoped for convenience in manual operation. The mower is then employed alone in conventional fashion.

Various changes and modifications may be made in this invention, as will be apparent to those skilled in the art. Such changes and modifications are included in the teachings of this invention and within the scope of the claims appended hereto.

What is claimed is:

1. Mowing apparatus comprising a free-wheeling four wheeled mower having a handle and a power plant mounted upon said mower for operating mowing mechanism, said power plant having power take-off means including a rotary power element, a separate wheeled carriage having means for carrying a person thereon, means detachably connecting said carriage to the mower in tandem and swivelling relation, said means comprising a pivot connection positioned on the axis of said rotary element, and means including a drive belt cooperating with the mower power take-off element for powering the wheels of said carriage to propel the carriage and the mower along the ground.

2. Mowing apparatus comprising a free-wheeling four wheeled mower having a handle and a power plant mounted upon said mower for operating mowing mechanism, said power plant having power take-off means including a rotary power element, a separate wheeled carriage having means for carrying a person thereon, means detachably connecting said carriage to the mower in tandem and swivelling relation, said means comprising a pivot connection positioned on the axis of said rotary element, and means including a drive belt cooperating with the mower power take-off means for powering the wheels of said carriage to propel the carriage and the mower along the ground, clutch means mounted on the carriage cooperating with the drive belt for controlling the power delivered to the carriage wheels independently of the operation of the power mower, said clutch means including biasing means to disengage the power means from the carriage wheels in the non-operated position.

3. Mowing apparatus comprising a free-wheeling four wheeled mower having a handle and a power plant mounted upon said mower for operating mowing mechanism, said power plant having power take-off means including a rotary power element, a separate wheeled carriage having means for carrying a person thereon, means detachably connecting said carriage to the mower in tandem and swivelling relation, said means comprising a pivot connection positioned on the axis of said rotary element, said pivot connection including a universal joint mounted on the axis of said rotary element for vertical and horizontal pivotable movement between the carriage and the mower, and drive belt means cooperating with the mower power take-off element for powering the wheels of said carriage to propel the carriage and the mower along the ground.

4. Mowing apparatus comprising a free-wheeling four wheeled mower having a handle and a power plant mounted upon said mower for operating mowing mechanism, said power plant having power take-off means independent of said mowing mechanism, said power take-off means including a pulley wheel powered by said power plant and a pulley belt connected thereto at one end and a power take-off pulley block at its other end, a separate wheeled carriage having means detachably connecting it to said mower, said means comprising a pivot connection positioned on the axis of said pulley block and means cooperating with the power take-off means for powering the wheels of said carriage which comprises a carriage pulley belt connected between the pulley block and a pulley wheel positioned in driving relation to the wheels of said carriage.

5. Mowing apparatus comprising a free-wheeling four wheeled mower having a handle and a power plant mounted upon said mower for operating mowing mechanism, said power plant having power take-off means independent of said mowing mechanism, said power take-off means including a pulley wheel powered by said power plant and a pulley belt connected thereto at one end and a power take-off pulley block at its other end, a separate wheeled carriage having means detachably connecting it to said mower, said means comprising a pivot connection positioned on the axis of said pulley block and means cooperating with the power take-off means for powering the wheels of said carriage which comprises a carriage pulley belt connected between the pulley block and a pulley wheel positioned in driving relation to the wheels of said carriage, and clutch means mounted on the carriage biased to disengage the carriage pulley belt from driving relation with respect to said carriage wheels, said clutch means being operable by the operator to engage the pulley belt in power transmitting relationship.

6. Mowing apparatus comprising a free-wheeling four wheeled mower having a handle and a power plant mounted upon said mower for operating mowing mechanism, said power plant having power take-off means independent of said mowing mechanism, said power take-off means including a pulley wheel powered by said power plant and a pulley belt connected thereto at one end and a power take-off pulley block at its other end, a separate wheeled carriage having means for carrying a person thereon, means detachably connecting said carriage to the mower in tandem and swivelling relation, said connecting means including a universal joint mounted on the axis of said pulley block for vertical and horizontal pivotable movement between the carriage and the mower, and means for powering the wheels of the carriage comprising a carriage pulley belt connected at one end to a pulley wheel mounted on the carriage in driving relation to the carriage wheels and at its other end to a pulley wheel in said block.

References Cited in the file of this patent
UNITED STATES PATENTS

| | | |
|---|---|---|
| 652,648 | Sommer | June 26, 1900 |
| 1,557,902 | Thompson | Oct. 20, 1925 |
| 1,754,407 | Stearman | Apr. 15, 1930 |
| 2,237,521 | Frazier | Apr. 8, 1941 |
| 2,582,177 | Swisher et al. | Jan. 8, 1952 |
| 2,620,613 | Bradley | Dec. 9, 1952 |
| 2,650,439 | Hickman | Sept. 1, 1953 |
| 2,676,032 | Stegman | Apr. 20, 1954 |
| 2,678,462 | Lison et al. | May 18, 1954 |
| 2,691,421 | Swanson | Oct. 12, 1954 |
| 2,701,616 | Cooper | Feb. 8, 1955 |
| 2,708,484 | Hoffman | May 17, 1955 |
| 2,760,589 | Rudman | Aug. 28, 1956 |
| 2,828,827 | Chouinard | Apr. 1, 1958 |

FOREIGN PATENTS

| | | |
|---|---|---|
| 1,038,331 | France | May 6, 1953 |